United States Patent [19]

Sanci et al.

[11] 4,120,566

[45] Oct. 17, 1978

[54] REARVIEW APPARATUS FOR VEHICLES

[76] Inventors: Salvatore Sanci; Innocenzio Di Mauro, both of 71 Wolverleigh Blvd., Toronto, Ontario, Canada

[21] Appl. No.: 788,361

[22] Filed: Apr. 18, 1977

[51] Int. Cl.² ............................................. G02B 5/08
[52] U.S. Cl. ................................................. 350/302
[58] Field of Search .................. 350/9, 299, 301, 302, 350/307

[56] References Cited

U.S. PATENT DOCUMENTS

| | | | |
|---|---|---|---|
| 1,649,083 | 11/1927 | Ruth | 350/302 |
| 2,298,341 | 10/1942 | Brinkley | 350/302 |
| 2,501,067 | 3/1950 | Lusebrink | 350/302 |
| 3,394,978 | 7/1968 | Muller | 350/302 X |
| 3,857,632 | 12/1974 | Yamashita et al. | 350/302 |

FOREIGN PATENT DOCUMENTS 2,014,696  10/1971  Fed. Rep. of Germany ........... 350/302

*Primary Examiner*—F. L. Evans
*Attorney, Agent, or Firm*—Robert D. Farkas

[57] ABSTRACT

This disclosure pertains to a rearview image projecting apparatus utilizing a pair of rearwardly turned periscopes providing a view from the rear of the vehicle, passing over the roof portions thereof, and thence through the front windshield into a pair of image diverting assemblies so as to cause the pair of projected images to enter, at opposite ends, an image viewing apparatus. The image viewing apparatus utilizes lens means and selective light intensity filter means to combine both images supplied thereto into a single projected image on a viewing screen visibly accessible to the operator of the vehicle.

9 Claims, 6 Drawing Figures

REARVIEW APPARATUS FOR VEHICLES

BACKGROUND OF THE INVENTION

1. Field of the Invention

This invention relates to visual aid apparatus adapted for mounting on motor vehicles and more particularly to that class utilizing optical systems to project a rearview into a viewing position, visually accessible to the operator of the vehicle.

2. Description of the Prior Art

The prior art abounds with rearview mirrors for vehicles. U.S. Pat. No. 3,773,406 issued on Nov. 20, 1973 to J. D. Baumgardner, et al. teaches a rearview periscope system utilizing three mirrors, at least one of which is mounted within the vehicle.

U.S. Pat. No. 3,857,632 issued on Dec. 31, 1974 to M. Yamashita, et al. discloses a periscope type rearview mirror apparatus piercing the roof top of the vehicle and providing an image on a mirror apparatus mounted within the vehicle.

U.S. Pat. No. 2,569,576 issued on Oct. 2, 1951 to C. Ramme describes a periscope apparatus piercing through a portion of the roof of a motor vehicle, having a plurality of divergent rearwardly directed mirror elements whose received images are transmitted to the interior of the vehicle onto an eyepiece mirror for viewing by the operator of the vehicle.

All the aforementioned patents suffer the common deficiency of utilizing a periscope type apparatus which is centrally disposed along the midline of the vehicle, thereby limiting the width and the shape of the optical field, at the rear of the vehicle, to be viewed thereby.

SUMMARY OF THE INVENTION

A primary object of the present invention is to provide an eyepiece apparatus which presents a view obtained from a pair of periscope apparatus disposed adjacent the sides of the vehicle thereby enhancing the width and height of the field to be viewed in a rearward direction of the vehicle.

Another object is to provide a single eyepiece apparatus which simultaneously presents an image obtained from a pair of individually directed periscope apparatus.

Still another object is to provide a rearview apparatus which eliminates the need for side view mirrors, easily misaligned, and a rearview mirror, easily obstructed by passengers and other impediments disposed on the rear window.

Yet another object is to provide a rearview vision apparatus which may selectively employ light filtering means to minimize glare, when desired.

A further object is to provide a rearview vision apparatus which provides an enlarged rearview representation, enhancing thereby the vehicle operator's ability to perceive small or rapidly moving objects.

A pair of rearwardly turned periscopes are fastened outboard and adjacent to the uppermost and outermost edges of the front windshield of a motor vehicle. The mouths of periscopes may be directed rearwardly, in convergent or divergent directions, by pitching and yawing the periscope assemblies relative to the vehicle's front windshield. The transmitting ends of the periscopes are directed towards the plane of the front windshield which permits the images to be transmitted therethrough. Each of the pair of image diverting assemblies employ reflective surfaces so as to cause the individual light rays representing the individual images obtained from each of the periscope assemblies to be directed towards each other and to pass through windows disposed on opposite side walls of the image viewing apparatus. Both the pair of image diverting assemblies and the image viewing apparatus are mounted within the vehicle in such a way that the image diverting assemblies may be adjusted to compensate for the pitch and yaw of the rearwardly turned periscopes whilst the image viewing apparatus may be located adjacent a central portion of the uppermost edge of the front windshield, thereby enhancing the frontmost vision field accessible to the operator of the vehicle.

The image viewing apparatus utilizes a pair of angularly displaced mirror devices to converge the individually received images from each of the image diverting assemblies into a common image amplified by a "zoom" lens assembly. The image available at the transmitting end of the "zoom" assembly is ultimately directed to the eyepiece apparatus, which contains both rear views. Filtering means, selectively employed, may filter glare containing images before presentment to the eyepiece screen.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a pair of periscope housings adjustably affixed to the external portions of a motor vehicle, each individually and adjustably permitting a portion of the rear view thereof to be transmitted through the front windshield portion of the vehicle and into a pair of image diverting assemblies, adjustably secured to the interior portions of the vehicle, adjacent those portions of the windshield through which the periscope derived images are passed. A centrally located image viewing apparatus receives each of the signals transmitted from the image diverting assemblies so as to combine them, after expanding the size thereof by lens means, and after selective filtering thereof, onto a common viewing screen displaying the combined visual images in a generaly rearward direction.

The instant invention utilizes reflective elements of the front surface mirror variety, preferably constructed of a plastic material for safety purposes, in order to insure a maximum in the intensity in the images reflected thereby. The lens means may be stationary or adjustable in character so as to change the size of the received image on the eyepiece screen. Flexible shroud devices seal the transmitting part of the periscope to the external surface of the front windshield precluding dirt, water, snow, or ice to enter the portions of the window transmitting the signals.

Figure 1:
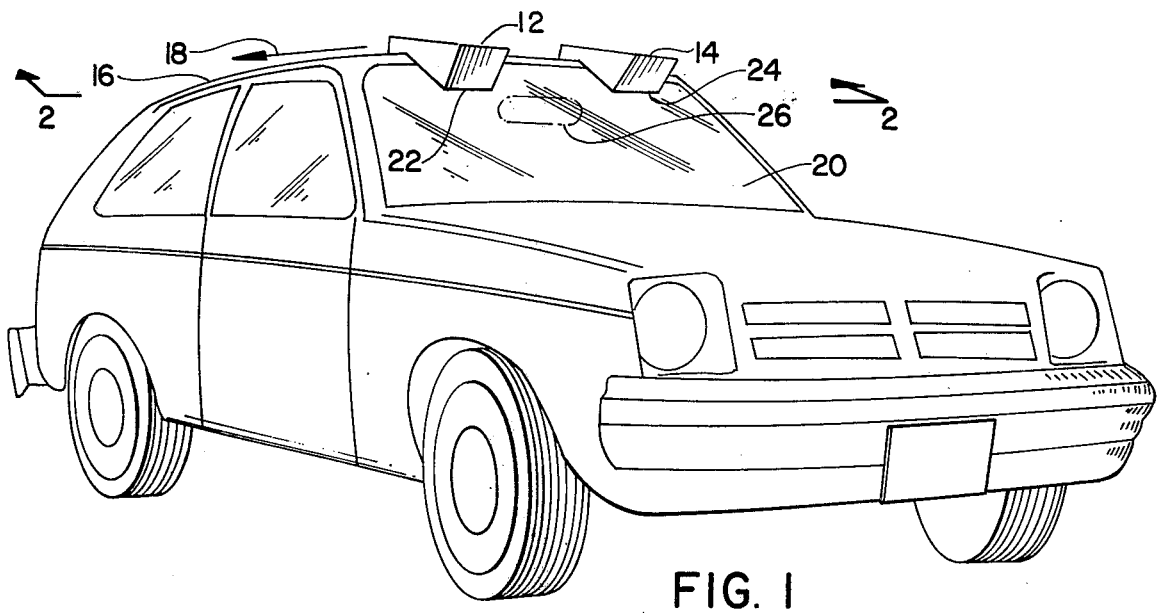
FIG. 1 is a perspective view of a motor vehicle equipped with the instant apparatus.

Now referring to the Figures, and more particularly to the embodiment illustrated in FIG. 1 showing a motor vehicle 10 to which rearwardly turned periscopes 12 and 14 are installed projecting over roof 16 in substantially the rearward direction of arrow 18. Front windshield 20 passes images from the transmitting ends 22 and 24 of rearwardly turned periscopes 12 and 14, respectively. An image viewing apparatus 26 is utilized to collect and display the rearview image discerned by rearwardly turned periscopes 12 and 14.

Figure 2:
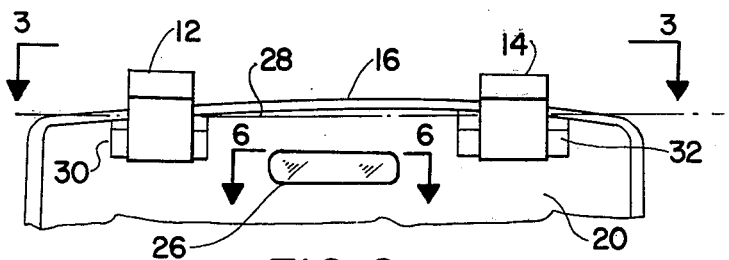
FIG. 2 is a front elevation view taken along line 2—2 viewed in the direction of arrows 2—2 as shown in FIG. 1.

FIG. 2 illustrates roof 16 and a portion of front windshield 20 converging along a substantially horizontal line 28. Rearwardly turned periscopes 12 and 14 extend above and below line 28 and are utilized to provide light rays to image diverting assemblies 30 and 32, respectively. Image viewing apparatus 26 collects light rays transmitted from image diverting assemblies 30 and 32. Rearwardly turned periscopes 12 and 14 may be directed along divergent or convergent lines that extend substantially rearwardly from windshield 20.

Figure 3:
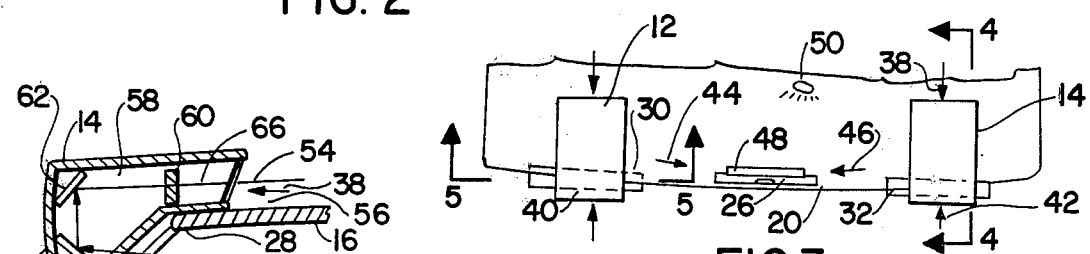
FIG. 3 is a plan view taken along line 3—3 viewed in the direction of arrows 3—3 as shown in FIG. 2.

FIG. 3 illustrates windshield 20 having periscopes 12 and 14 situated forwardly thereof. Image diverting assemblies 30 and 32 are shown located behind windshield 20 as is image viewing apparatus 26. Light rays depicting the rearward view, travel in the directions of arrows 36 and 38 into periscopes 12 and 14, respectively. Images transmitted from periscopes 12 and 14 travel in the directions of arrows 40 and 42 into image diverting assemblies 30 and 32, by passing through windshield 20. Light rays eminating from image diverting assemblies 30 and 32 traveling in the directions of arrows 44 and 46, respectively, enter image viewing apparatus 26, for amplification and subsequent display on a display panel 48 thereof for viewing by the eye 50 of the operator of the vehicle.

Figure 4:
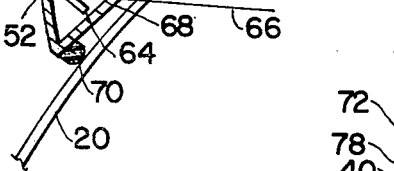
FIG. 4 is a side elevation cross-sectional view taken along line 4—4 viewed in the direction of arrows 4—4 as shown in FIG. 3.

FIG. 4 illustrates the cross-section of the housing 52 of periscope 14 mounted adjacent a portion of windshield 20 and roof 16. Plastic screen 54 enables light rays 38 to enter the rearmost opening 56 located in the periscope so as to protect the cavity 58 within the periscope housing 52 from contamination and dirt. Lens 60 having a short focal length such as fresnel negative, 1-3/16" × 1-9/16", F. L. 67 mm, may be employed. Front surface mirrors 62 and 64, of the unbreakable variety, enable light rays 66 to pierce a portion of front windshield 20 after passing through an opening 68 in housing 52, adjacent the exterior surface of the window. A flexible packing 70 is disposed adjacent the marginal edges of window 68 limiting the admission of dirt and other vision obscuring materials from being introduced on the exterior surface of the window adjacent opening 68.

Figure 5:
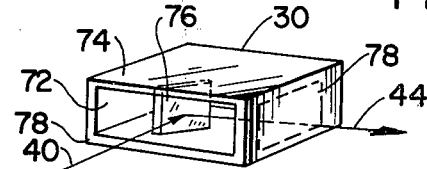
FIG. 5 is a front elevation cross-sectional view taken along line 5—5 viewed in the direction of arrows 5—5 as shown in FIG. 3.

FIG. 5 shows image diverting assembly 30. The image transmitted in the direction of arrow 40 from periscope 12 passes through opening 72 in housing 74. Front surface mirror 76 diverts the direction of the image received into the direction of arrow 44 passing through window 78. The angular relationship of front surface 76 to window 72 and window 78 is adjustable by conventional means to facilitate the mounting position assumed by periscope 12 shown in FIG. 3 relative to front windshield 20. Frontmost marginal edges 78 are adapted with a compressible gasket-like material, extending outwardly therefrom for sealing engagement with the interior surfaces of windshield 20 shown in FIG. 3.

Figure 6:
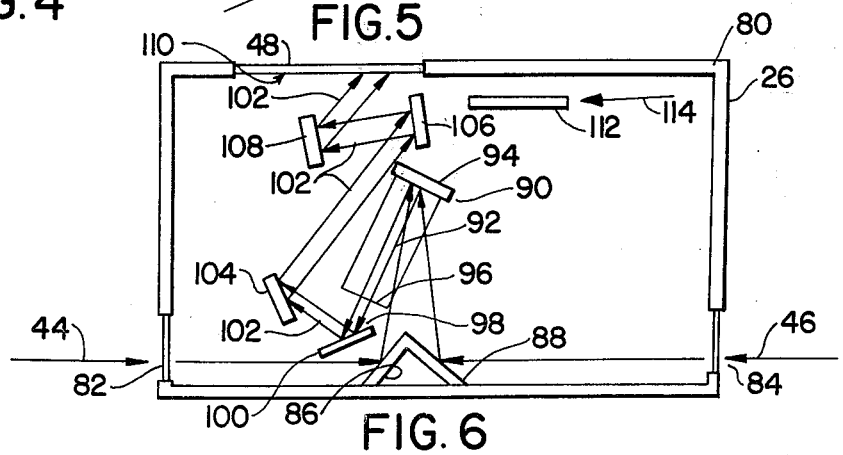
FIG. 6 is a cross-sectional plan view taken along line 6—6 viewed in the direction of arrows 6—6 as shown in FIG. 2.

FIG. 6 illustrates image viewing apparatus 26 having a housng 80. Window 82 and window 84 permit the passage of light rays 44 and 46 therethrough. Front surface mirrors 86 and 88 reflect light rays 44 and 46, respectively, onto front surface mirror 94, which are in turn reflected into the image receiving port 90 of "zoom" lens assembly 92. The light transmitting port 96 of "zoom" lens assembly 92 transmits light rays 98 onto front surface mirror 100. Light rays 102 progress, reflectively, from front surface mirrors 104, 106, and 108 to the rearmost face 110 of a translucent display panel 48 disposed within an opening within housing 80. Light filter 112 may be transported, in the direction of arrow 114 so as to filter light rays 102 from a glaring to a darkened condition before being projected on surface 110 of display panel 48.

One of the advantages is to provide an eyepiece apparatus which presents a view obtained from a pair of periscope apparatus disposed adjacent the sides of the vehicle thereby enhancing the width and height of the field to be viewed in a rearward direction of the vehicle.

Another advantage is to provide a single eyepiece apparatus which simultaneously presents an image obtained from a pair of individually directed periscope apparatus.

Still another advantage is to provide a rearview apparatus which eliminates the need for side view mirrors, easily misaligned, and a rearview mirror, easily obstructed by passengers and other impediments disposed on the rear window.

Yet another advantage is to provide a rearview vision apparatus which may selectively employ light filtering means to minimize glare, when desired.

A further object is to provide a rearview vision apparatus which provides an enlarged rearview representation, enhancing thereby the vehicle operator's ability to perceive small or rapidly moving objects.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. A rearview apparatus for vehicles for providing a rear field of vision via the roof top of a vehicle comprising a pair of periscope devices, said pair of periscope devices each having an open rear end for interception therein of a portion of the forwardly projecting light rays extending from the rear of said vehicle towards the front of said vehicle and an open rear lower portion, said open rear lower portion being disposed adjacent the front windshield of said vehicle, an image viewing apparatus having a display panel, a pair of image diverting assemblies for directing light rays transmitted through said front windshield by said pair of periscope devices to said image viewing apparatus, image size expanding means for expanding said light rays directed by said image diverting assemblies into expanded size light rays so as to provide an expanded view thereof upon said display panel, said image viewing apparatus and said pair of image diverting assemblies being disposed within the interior confines of said vehicle and affixed thereto, light filtering means for selectively filtering said expanded size light rays before said expanded size light rays are displayed on said display panel, the apparatuses comprising said light filtering means and said image expanding means being located in a first housing, said apparatus comprising said light filtering means being located adjacent said display panel, flexible packing means for excluding vision obstructing objects from between said open rear lower portion and said front windshield.

2. The rearview apparatus for vehicles as claimed in claim 1 further comprising said open rear ends of said pair of periscope devices each being directed divergently.

3. The rearview apparatus for vehicles as claimed in claim 1 wherein said image size expanding means comprises a "zoon" lens assembly, said first housing containing said "zoom" lens assembly and a first opening, said display panel substantially covering said first opening.

4. The rearview apparatus for vehicles as claimed in claim 3 wherein said light filtering means comprises a light filtering apparatus for selective placement between said "zoom" lens assembly and said first opening.

5. The rearview apparatus for vehicles as claimed in claim 3 wherein each of said pair of periscope devices comprises a second housing, a first and a second front surface mirror, a lens, a transparent window element, a second and third opening in said second housing, said second opening directed towards the rear of said vehicle, said transparent window element closing said second opening, said lens being disposed in the optical path of said portion of said forwardly projecting light rays entering said second opening, said first and said second front surface mirrors for optically directing said portion of said forwardly projecting light rays through said third opening and through portions of said front windshield, said second housing adjustably affixed to said vehicle, said third opening being disposed in said open rear lower portion of said periscope device.

6. The rearview apparatus for vehicles as claimed in claim 5 wherein one of said pair of image diverting assemblies comprises a third front surface mirror, a third housing, a fourth opening and a fifth opening in said third housing, said portion of said forwardly projecting light rays projecting onto said third front surface mirror and directed through said fifth opening in said third housing.

7. The rearview apparatus for vehicles as claimed in claim 6 wherein said image viewing apparatus further comprises a sixth and seventh opening passing through the walls of said first housing, at least a fourth and a fifth front surface mirror, said portion of said forwardly projecting light rays passing through said fifth opening in said third housing for passage through said sixth opening in said first housing and for reflection from said fourth front surface mirror into a light receiving portion of said "zoom" lens assembly, said fifth front surface mirror for reflecting said portion of said forwardly projecting light rays transmitted from the other of said pair of image diverting assemblies into said light receiving portion of said "zoom" lens assembly, said fourth and said fifth front surface mirrors being disposed within said first housing.

8. The rearview apparatus for vehicles as claimed in claim 7 further comprising a sixth front surface mirror for reflecting said portion of said forwardly projecting light rays reflected from said fourth and said fifth front surface mirrors into said light receiving portion of said "zoom" lens assembly, said sixth front surface mirror being disposed in said first housing.

9. The rearview apparatus for vehicles as claimed in claim 8 further comprising a seventh and an eight and a ninth and a 10th front surface mirror being disposed in said first housing, said seventh and said eighth and said ninth and said 10th front surface mirrors for optically directing said portion of said forwardly projecting light rays from a light transmitting portion of said "zoom" lens assembly to said display panel.

* * * * *